United States Patent [19]
Leynaert et al.

[11] 3,814,323
[45] June 4, 1974

[54] JET PROPULSION ENGINES FOR SUPERSONIC AIRCRAFT OR VEHICLES

[75] Inventors: Jacky R. Leynaert, Igny; Bernard J. Mechin, Fontenay-aux-Roses, both of France

[73] Assignee: Office National D'Etudes Et De Recherches Aerospatiales, Chatillon-Sous-Bagneux, France

[22] Filed: Dec. 15, 1972

[21] Appl. No.: 315,338

[30] Foreign Application Priority Data
Jan. 6, 1972 France................................ 72.369

[52] U.S. Cl... 239/265.17, 239/265.19, 239/265.29, 239/265.37
[51] Int. Cl........................ B63h 25/46, B64c 15/10
[58] Field of Search..... 239/265.17, 265.19, 265.29, 239/265.37; 60/224, 226

[56] References Cited
UNITED STATES PATENTS

| 3,231,197 | 1/1966 | Strom ..................... 239/265.17 |
| 3,346,193 | 10/1967 | Tumicki..................... 239/265.17 |
| 3,463,402 | 8/1969 | Langston, Jr. ................. 239/265.17 |
| 3,511,441 | 5/1970 | Tumicki..................... 239/265.29 |
| 3,722,797 | 3/1973 | Hammill ..................... 239/265.37 |
| 3,749,316 | 7/1973 | Tontini ..................... 239/265.17 |

*Primary Examiner*—Lloyd L. King
*Attorney, Agent, or Firm*—Larson, Taylor and Hinds

[57] ABSTRACT

These engines have a front part shielding a gas generator and a rear part constituted by an exhaust nozzle. The exhaust nozzle comprises a streamlined element, doors and flaps, the doors and the flaps being arranged to occupy different configurations according to the conditions of flight. The invention is particularly useful for jet propulsion engines for supersonic aircraft.

19 Claims, 9 Drawing Figures

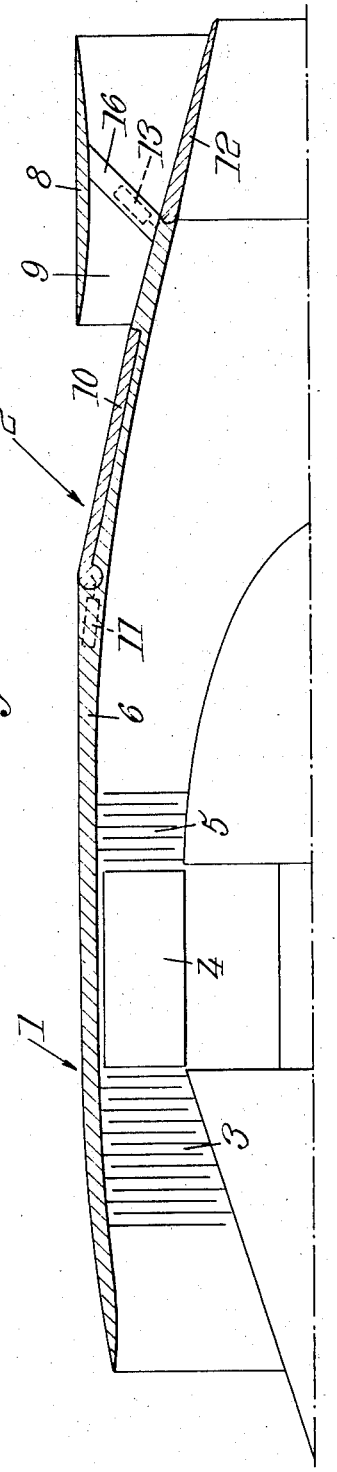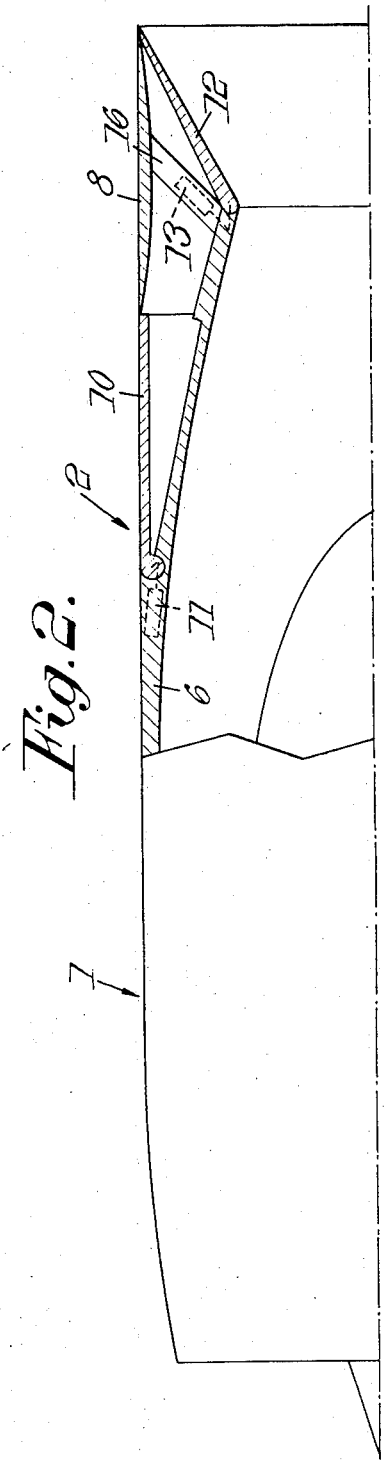

JET PROPULSION ENGINES FOR SUPERSONIC AIRCRAFT OR VEHICLES

BACKGROUND OF THE INVENTION

The invention relates to jet propulsion engines for supersonic aircraft or vehicles, these engines comprising a front part shielding a gas generator with one or several gas streams (one of these gas streams being possibly air collected further upstream), and a rear part constituted by an exhaust nozzle through which the gases emerging from the gas generator are expelled to the atmosphere.

The invention is more particularly applicable to jet propulsion engines comprising a double flow generator.

It is known that the speed range of the flight of an aircraft or so-called "supersonic" vehicle includes subsonic flight and supersonic flight and it is hence necessary to be able to adapt the exhaust nozzle to the conditions of subsonic and transsonic flight and to the conditions of supersonic flight.

PRIOR ART

To this end, solutions have already been proposed consisting of including in the exhaust nozzle a certain number of flaps or doors and among these solutions there may be mentioned that known under the Anglo-saxon name "blow-in-door".

This solution is particularly described in U.S. Pat. No. 3,062,003, which relates to a jet propulsion engine comprising a twin flow generator. The exhaust nozzle of the engine described in this patent comprises an outer or main duct surrounding a primary or inner duct, the main duct being supplied by the secondary flow from the generator, whilst the primary duct is supplied by the primary flow from the generator. The main duct is extended by a rear duct which forms a convergent-divergent portion defining a downstream throat; a first series of doors is provided between the main duct and the rear duct and a second series of flaps is provided to extend the rear duct.

For subsonic and transsonic flight, the flaps of the first series occupy an open position and allow passages to be opened through which a flow of external air is induced and is mixed in the convergent-divergent section of the rear duct, and the flaps of the second series occupy a folded-back position in extension of the external portion of the rear duct.

For supersonic flight, the flaps of the first series occupy a closed position for which they are connected to the outer wall of the rear duct, and the flaps of the second series occupy a deployed position in extension of the divergent section of the rear duct.

An exhaust nozzle constructed according to such a solution has however drawbacks due to the existance of certain changes of direction, of strongly inclined flaps, and of breaks in the internal and external profiles of the duct. A reduction in performance, due to an increase in drag is therefore noticed.

Moreover, the rear duct supports the second series of flaps as well as their actuating means; this rear duct must hence be designed to resist more or less considerable mechanical forces.

There has also been proposed an improved solution based on the "blow-in-door" solution by providing means for causing the cross-section of the throat defined by the rear duct to vary. This improved solution is described in U.S. Pat. No. 3,346,193, but it has the drawback of increasing the weight of the rear duct and obliging it to include several movable elements which complicate its construction.

OBJECT OF THE INVENTION

It is an object of the present invention to overcome the aforementioned drawbacks.

It is a particular object of the invention to provide an exhaust nozzle which both in its configuration for subsonic and transsonic flight and for its configuration for supersonic flight, introduces neither sudden changes in direction, nor highly inclined flaps, nor discontinuities in the internal and external profiles.

Other objects and advantages will become apparent from the description which follows.

SUMMARY OF THE INVENTION

The jet propulsion engine according to the invention comprises a front part shielding a gas generator and a rear part constituted by an exhaust nozzle, this exhaust nozzle comprising a main duct supplied by the gas generator provided with various flaps or doors to adapt it to various conditions of flight and it is characterised by the fact that this exhaust nozzle comprises:

a streamlined element enveloping at least partially the end of this main duct and defining with it an outer passage, doors arranged over a part at least of the outerside of the main duct, these doors being arranged to be able to pass, by the action of first actuating means, between a retracted position for which they re-establish the shape of the outer side of the main or outer duct and an extended position for which their downstream edge becomes connected with the upstream edge of the streamlined element, and flaps arranged over part at least of the end of the main duct, these flaps being arranged to be able to pass, under the action of second actuating means, between a folded-back position for which they extend substantially the inner convergent side of the main duct and a deployed position, forming a divergent portion, for which their downstream edge becomes connected with the streamlined element.

For subsonic and transsonic flight, the doors occupy their retracted position and the flaps their folded-back position. The flow of gases emerging from the gas generator operates by means of a channel defined by the inner side of the main duct extended by the convergent portion formed by the folded-back flaps, whilst the external flow is produced around a streamlined structure defined by the outer side of the main duct, the doors in retracted position, the outer passage and the streamlined element.

For supersonic flight, the doors occupy their extended position and the flaps their deployed position; the flow of gases emerging from the gas generator being operated by means of a channel defined by the inner side of the main duct extended by a divergent portion formed by the deployed flaps connected to the streamlined element, whilst the external flow is produced around a streamlined structure defined by the outer side of the main duct, the doors in extended position and the streamlined element.

In the case of an engine comprising a twin flow generator, the main duct surrounds a primary duct; under these conditions, and in manner known in itself, the end of the primary duct may be made to include a device of variable cross-section.

BRIEF DESCRIPTION OF THE DRAWINGS

The accompanying drawings, relate to preferred embodiments of the invention and do not include, of course, any limiting character.

In the drawings:

FIGS. 1 and 2 are two diagrammatic cross-sections illustrating a first embodiment of the jet propulsion engine according to the invention, FIG. 1 showing the exhaust nozzle in its subsonic or transsonic flight configuration, and FIG. 2 showing the exhaust nozzle in its supersonic flight configuration.

DESCRIPTION OF SOME EMBODIMENTS OF THE INVENTION

Figure 3:
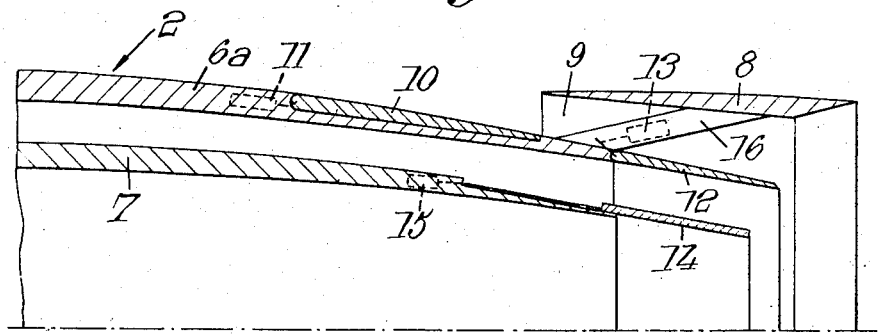
FIGS. 3 and 4 are two partial diagrammatic cross-sections illustrating a second embodiment of the invention, FIG. 3 showing the exhaust nozzle in its subsonic or transsonic flight configuration, and FIG. 4 showing the exhaust nozzle in its supersonic flight configuration.

In FIGS. 1 and 2, a jet propulsion engine is shown comprising a front part 1 shielding a gas generator and a rear part 2 constituted by an exhaust nozzle.

The gas generator can be constituted, as illustrated in FIG. 1, by a compressor 3, combustion chambers 4 and a turbine 5 driving said compressor. Such a gas generator delivers a single stream of gas.

The exhaust nozzle comprises a main duct or outer duct 6 supplied by this gas stream.

Figure 4:
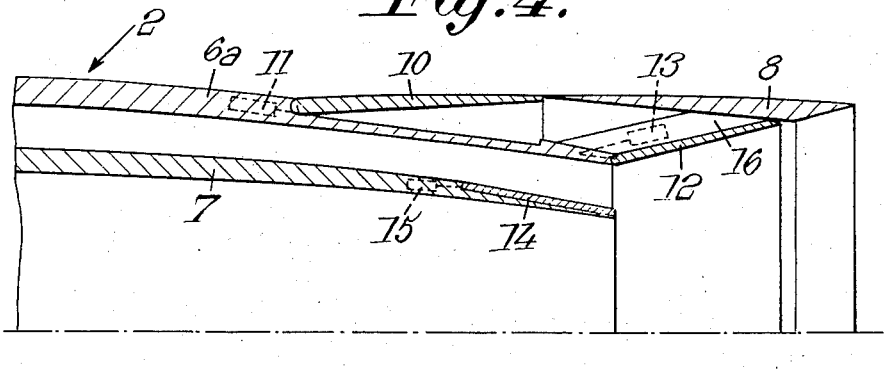
Figure 5:
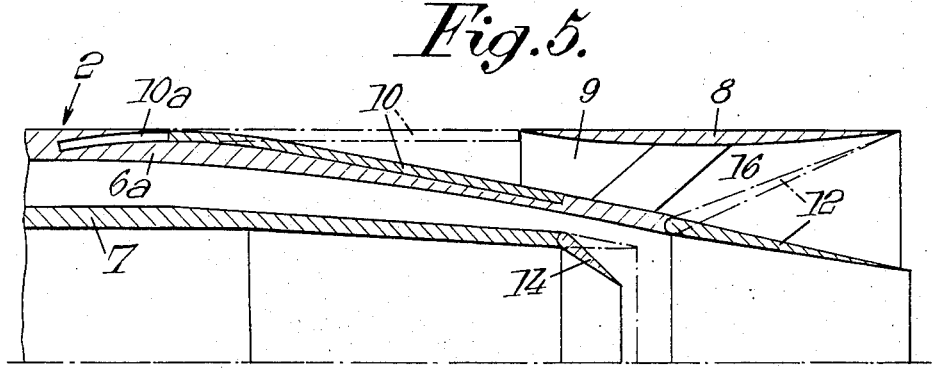
FIG. 5 is a partial diagrammatic section illustrating a third embodiment of the invention, the tracing in solid lines showing the exhaust nozzle in its subsonic or transsonic flight configuration, and the discontinuous line showing the exhaust nozzle in its supersonic flight configuration.

In FIGS. 4 and 5, there is shown only the rear portion 2 of a jet propulsion engine of which the front portion surrounds a twin flow gas generator delivering a primary flow coming from the turbine and a secondary flow which can originate in air by-passed from the compressor and which has circulated in various members of the gas generator (cooling, suction of the boundary layer, etc.).

The exhaust nozzle then comprises an outer duct 6a surrounding a primary or inner duct 7, the outer duct 6a being supplied by the secondary flow from the gas generator, whilst the inner duct 7 is supplied by the primary flow from the gas generator.

According to the invention, the exhaust nozzle shown in FIGS. 1 and 2 and FIGS. 3 and 4 comprises:

a streamlined element 8 surrounding the end of the outer duct 6 (FIGS. 1 and 2) or 6a (FIGS. 3 and 4), this streamlined element 8 defining with the above-said outer duct an outer passage 9 which, in the case envisaged, has an annular shape, the doors 10 arranged on the outer side of the outer duct 6 (FIGS. 1 and 2) or 6a (FIGS. 3 and 4), these doors 10 being arranged to be able to pass, under the action of first actuating means 11, between a retracted position (FIGS. 1 and 3) which they re-establish the shape of the outer side of the outer duct 6 or 6a, and an extended or outer position (FIGS. 2 and 4) for which their downstream edge becomes connected with the upstream edge of the streamlined element 8, and flaps 12 arranged on the end of the outer duct 6 (FIGS. 1 and 2) or 6a (FIGS. 3 and 4), these flaps 12 being arranged to be able to pass, under the action of second actuating means 13, between a folded-back position (FIGS. 1 and 3) for which they extend the inner edge of the outer duct 6 or 6a and a deployed position (FIGS. 2 and 4) for which their downstream edge is connected to the streamlined element 8.

For subsonic or transsonic flight, the doors 10 occupy their retracted position and the flaps 12 their folded-back position (FIGS. 1 and 3).

For supersonic flight, the doors 10 occupy their outer position and the flaps 12 their deployed position (FIGS. 2 and 4).

According to an arrangement known in itself in twin flow gas generator engines, the primary duct 7 is provided at its end with a device of variable cross-section 14 which, under the action of third actuating means 15, can pass between a position of small opening (FIG. 3) and a position of wide opening (FIG. 4).

For certain conditions of operation, in particular for subsonic and transsonic flight, the device with the variable cross-section 14 occupies its position of small opening offering the primary flow a flow path into a convergent portion terminating in a "closed" (narrower) throat (FIG. 3).

For other conditions of operation, in particular with heating for supersonic flight, the variable cross-section device 14 occupies its position of large opening offering the primary flow a flow path into a convergent portion terminating in an "open" (wider) throat (FIG. 4).

In the embodiment of the invention shown in FIGS. 1 and 2, the streamlined element 8 has a thin airfoil, and the doors 10 are hinged on the outer side of the outer duct 6 at the level of a cross-section whose diameter is substantially equal to the outer diameter of the streamlined element 8. When the doors 10 occupy their outer position, the rear part 2 of the engine is substantially cylindrical and composed of the outer duct 6, doors 10 and streamlined element 8. It will be noted that it would also be possible to give the doors 10 a slightly incurved shape so that the cross-sections increase or diminish from upstream to downstream.

The flaps 12 are then arranged so that, for their deployed position, their downstream edge is connected to the downstream edge of the streamlined element 8.

In the embodiment of the invention shown in FIGS. 3 and 4, the streamlined element 8 has a thick airfoil and the doors 10 are hinged on the outer side of the outer duct 6a at the level of a cross-section whose diameter is less than the outer diameter of the streamlined element 8. When the doors 10 occupy their outer position, the rear part 2 of the engine has a slightly varying cross-section, with a minimum in line with the hinge of the doors 10.

The flaps 12 are then arranged so that, for their deployed position, their downstream edge connects with the inner side of the streamlined element 8, in the neighbourhood of the cross-section of largest thickness of the airfoil constituting the abovesaid element.

In the embodiment of the invention shown in FIGS. 3 and 4, the variable cross-section device 14 is constituted by overlapping flaps which can be withdrawn along the outer wall of the inner ducts 7 when they occupy their wide open position.

In the embodiments of the invention shown in FIGS. 1 to 4, the streamlined element 8 is held with respect to the outer duct by support arms 16.

As regards the first actuating means 11 for the doors 10, they can be constituted by the aerodynamic forces which are exerted on these doors 10 and which vary with the speed of the aircraft or of the missile. But they can also make use of an energy source, in which case they are constituted by hydraulic, pneumatic or electric jacks, housed within the thickness of the outer duct.

In the case where these first actuating means 10 are constituted by aerodynamic forces, it is advantageous to connect the doors 10 to damping devices arranged to avoid fluttering of said doors.

As regards the second actuating means 13 of the flaps 12, they can be constituted by aerodynamic forces which are exerted on these flaps 12 and which vary with the speed of the aircraft or of the device. However they can also rely upon an energy source, in which case they are constituted by hydraulic, pneumatic or electric jacks.

In the case where these second actuating means 13 are constituted by aerodynamic forces, it is advantageous to connect the flaps 12 to damping devices arranged to avoid fluttering of said flaps.

When these second actuating means 13 comprise hydraulic, pneumatic or electric jacks, or damping devices, it is advantageous to house said jacks or the said damping devices within the support arms 16 of the streamlined element 8.

In the embodiment of the invention shown in FIG. 5, in which the same reference numerals denote the same members as in FIGS. 3 and 4, the streamlined element 8 has a thin airfoil and the doors 10 are arranged on the outer side of the outer duct 6a, so that the downstream part of each door 10 slides into an incurved housing 10a causing, on one hand, the rearward withdrawal of the door 10, and on the other hand its passage towards the outer position. When the doors 10 occupy their retracted position, the outer duct 6a has a shape free of sudden changes in curvature, whilst when the doors 10 occupy their outer position the rear part 2 of the engine is substantially cylindrical and composed of the outer duct 6, the doors 10 and the streamlined element 8.

The variable cross-section device 14 can be constituted by overlapping flaps pivoting on the end of the inner duct 7 and arranged so that when they occupy their wide open position they extend this inner duct 7 parallel to the part facing the outer duct 6a.

In FIG. 5, the various movable elements are shown in full lines in the position that they occupy for subsonic or transsonic flight conditions, and in mixed lines in the positions that they occupy for supersonic flight conditions.

Figure 6:
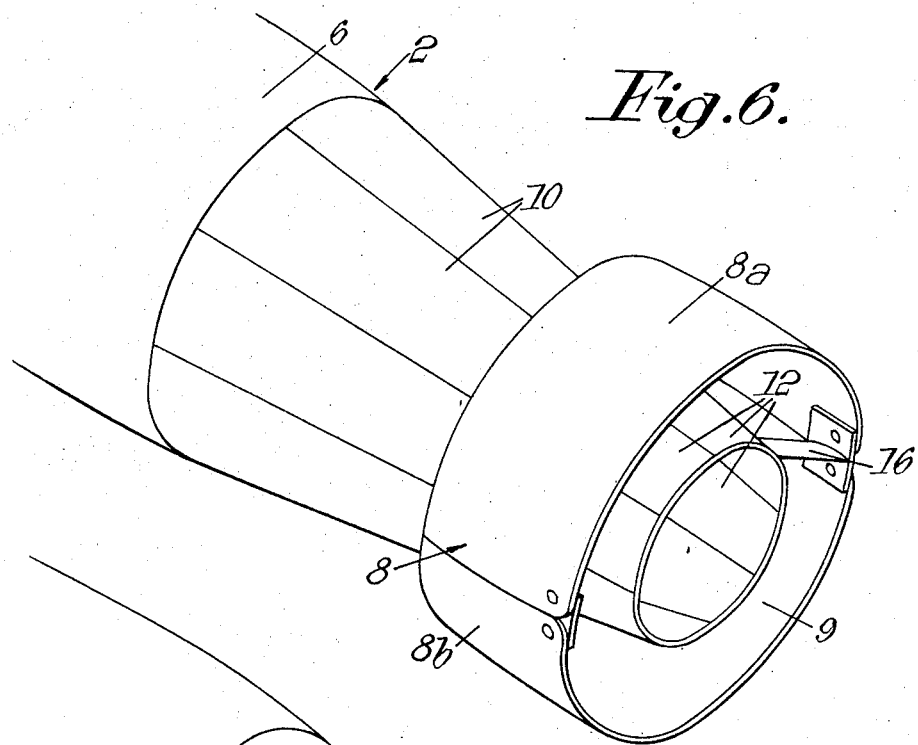
FIGS. 6 and 7 are two partial diagrammatic views in perspective illustrating a fourth embodiment of the invention, FIG. 6 showing the exhaust nozzle in its subsonic or transsonic flight configuration, and FIG. 7 showing the exhaust nozzle in its reverse thrust configuration.
Figure 7:
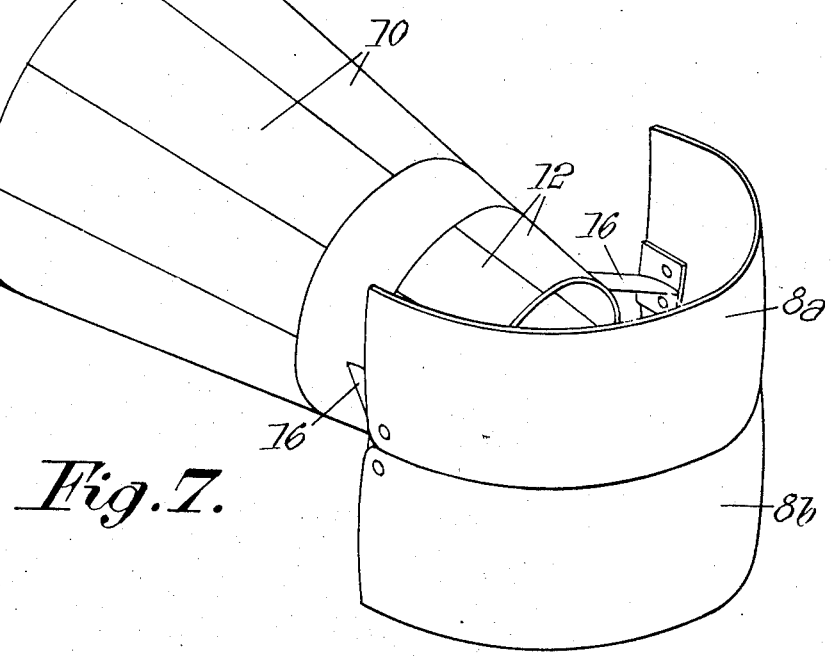

In a preferred embodiment of the invention, illustrated in FIGS. 6 and 7, in which the same reference numerals denote the same members as in FIGS. 1 and 2, the streamlined element 8 is constituted by at least two parts 8a, 8b arranged to be able to pass, under the action of fourth actuating means (not shown), between an active position for which the streamlined element 8 surrounds the end of the outer duct 6 to define with this outer duct 6 an outer passage and a so-called "reverse" position in which the two parts 8a, 8b come to intercept at least in part the flow emerging from the outer duct 6, and causing a change in direction of this flow adapted to procure a braking effect of the aircraft by thrust reversal.

According to another advantageous feature of the invention, it is possible to make the streamlined element 8 as well as the support arm 16 which hold it, fixed or retractable noise reduction members.

Figure 8:
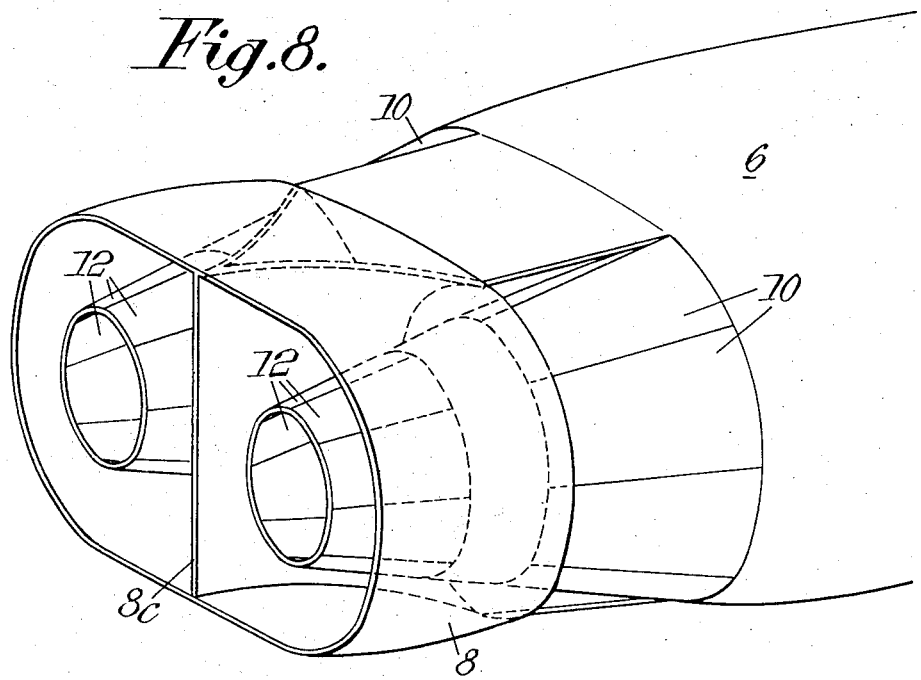
FIGS. 8 and 9 are two partial diagrammatic views in perspective illustrating a fifth embodiment of the invention applied to a side-by-side mounting of two engines, FIG. 8 showing the exhaust nozzle in its subsonic or transsonic configuration, and FIG. 9 showing the exhaust nozzle in its supersonic flight configuration.
Figure 9:
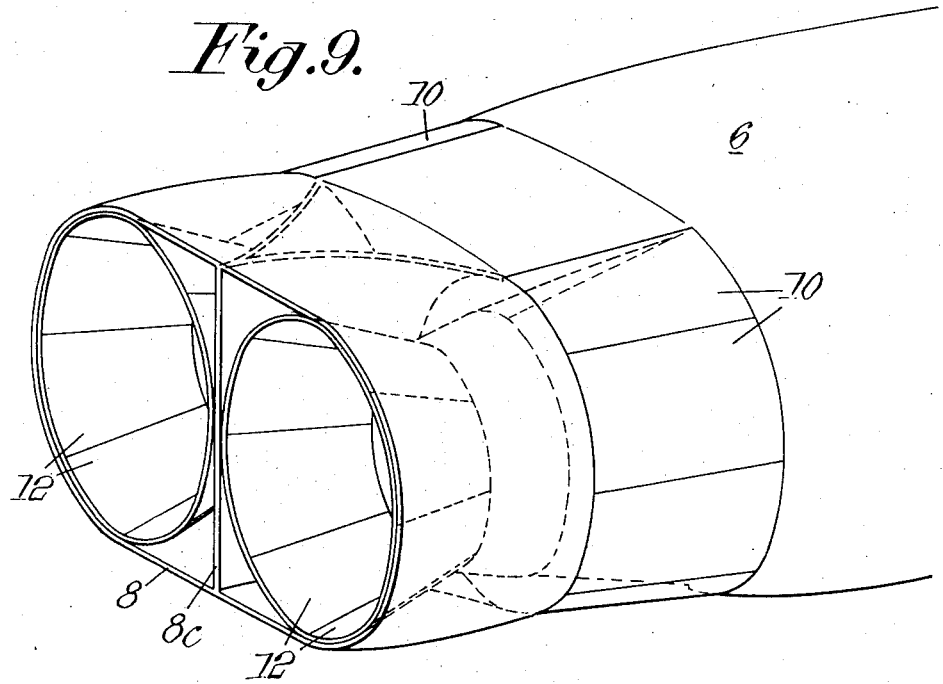

FIGS. 8 and 9, in which the same reference numerals denote the same members as in FIGS. 1 and 2, show an application of the invention to the side-by-side mounting of two engines, which mounting is known under the Anglo-saxon name "twin-jet."

In such a mounting, the streamlined element 8 partly surrounds each outer duct 6, but completely surrounds the two outer ducts 6 arranged side by side. The streamlined element 8 can include a middle separation 8c which is doubled and flares outwardly upstream to connect with the two outer ducts 6.

The doors 10 are arranged over a part only of the outer side of each outer duct 6, the assembly of said doors 10 occuring on the outer surfaces formed by the juxtaposition of the two outer ducts 6.

FIG. 8 corresponds to subsonic and transsonic flight conditions, and FIG. 9 to supersonic flight conditions.

In the various embodiments described above, it is assumed that the outer duct 6 or 6a leaves no gap facing the doors 10, that is to say when the doors 10 are in their outer position the inner side of the outer duct 6 or 6a remains continuous.

In other embodiments (not shown), the outer duct 6 or 6a can have openings facing the doors 10, that is to say when the doors 10 are in their outer position the inner side of the outer duct 6 or 6a has openings through which no flow is produced since these openings end in a closed space bounded by the doors 10, the streamlined element 8 and the flaps 12 which occupy their deployed position. This solution enables the structure of the outer duct 6 or 6a to be lightened, but it is not very satisfactory from the point of view of flow in the engine. Moreover, it is applied more particularly to twin flow engines, since in this case only the flow of the secondary stream is disturbed.

Finally, and whatever the embodiment adopted, there is provided an engine which can be adapted to all conditions of flight, subsonic, transsonic and supersonic, and this without sudden changes of direction, without strongly inclined flaps, and without breaks in the inner and outer profiles.

As is self-evident and as emerges already from the foregoing, the invention is in no way limited to those types of its application and embodiments which have been more especially envisaged; it encompasses, on the contrary, all modifications.

We claim:

1. Jet propulsion engine for a supersonic aircraft or vehicle, comprising a front part shielding a gas generator providing at least one stream of gas, and a rear part constituted by an exhaust nozzle, said exhaust nozzle comprising an outer duct supplied by the gas generator provided with various flaps or doors to adapt it to the various conditions of flight, said exhaust nozzle also comprising:

a streamlined element encircling at least partly the end of said outer duct and defining with it an outer passage, doors arranged on a portion at least of the outer side of the outer duct, said doors being arranged to be capable of passing, under the action of first actuating means, between a retracted position for which they reestablish the shape of the outside of the outer duct and an extended position for which their downstream edge becomes connected with the upstream edge of the streamlined element, and flaps, arranged on a portion at least of the end of the outer duct, these flaps being arranged to be able to pass, under the action of second actuating means, between a folded-back position for which they extend substantially inside of the outer duct and a deployed position for which their downstream edge connects with the streamlined element.

2. Engine according to claim 1, wherein the streamlined element has a thin airfoil and the flaps are arranged so that for their deployed position, their downstream edge connects with the downstream edge of the streamlined element.

3. Engine according to claim 1, wherein the streamlined element has a thick airfoil and the flaps are arranged so that, for their deployed position, their downstream edge connects with the inside of the streamlined element, in the neighbourhood of the section of greatest thickness of said streamlined element.

4. Engine according to claim 1, wherein the doors are hinged on the outer side of the outer duct at the level of a section whose diameter is substantially equal to the outer diameter of the streamlined element.

5. Engine according to claim 1, wherein the doors are hinged on the outside of the outer duct at the level of a section whose diameter is less than the diameter of the streamlined element.

6. Engine according to claim 1, wherein the first actuating means are constituted by hydraulic, pneumatic or electric jacks.

7. Engine according to claim 1, wherein the first actuating means are constituted by aerodynamic forces exerted on the doors.

8. Engine according to claim 6, wherein the doors are connected to damping devices.

9. Engine according to claim 1, wherein the second actuating means are constituted by hydraulic, pneumatic or electric jacks.

10. Engine according to claim 1, wherein the second actuating means are constituted by aerodynamic forces exerted on the flaps.

11. Engine according to claim 10, wherein the flaps are connected to damping devices.

12. Engine according to claim 9, wherein the hydraulic, pneumatic or electric jacks, or the damping devices, are housed in support arms holding the streamlined element.

13. Engine according to claim 1, wherein the doors are arranged on the outside of the outer duct, so that the downstream portion of each door slides in a concave housing causing, on one hand, the backward retraction of the door, and on the other hand, its passage towards the extended position.

14. Engine according to claim 1, wherein the streamlined element is constituted of at least two parts arranged to be able to pass, under the effect of fourth actuating means, between an active position for which the streamlined element surrounds the end of the outer duct and a "reverse" position for which the two parts intercept at least in part the stream emerging from the outer duct.

15. Engine according to claim 1, wherein at least one of the streamlined elements and the support arm which holds it comprise noise reduction members.

16. A twin engine according to claim 1, constituted by a pair of engines mounted side by side, wherein the streamlined element partly encircles each outer duct and completely encircles the pair of engines, the streamlined element comprising a middle separation splaying in the upstream direction to connect with the two outer ducts of the pair of engines, the doors being arranged over a part only of the outside of each outer duct, the group of said doors occurring on the outer half-surface of said engines.

17. Engine according to claim 1, wherein the outer duct is continued in line with the doors.

18. Engine according to claim 1, wherein the outer duct has openings corresponding to the doors.

19. Engine according to claim 1, comprising a twin flow generator, wherein the outer duct and the exhaust nozzle surround a primary duct, the outer duct being supplied by the secondary flow of the gas generator, whilst the primary duct is supplied by the primary flow from the gas generator, said primary duct being provided at its end with a device of variable cross-section which, under the action of third actuating means, can pass between a slightly open position offering the primary flow a path into a convergent "closed" throat form and a fully open position offering the primary stream a flow into a convergent form with "open" throat.

* * * * *